Jan. 20, 1925.  
G. H. McLARREN  
1,523,886  
AUTOMOBILE SIGNAL  
Filed Dec. 12, 1923  
2 Sheets-Sheet 1
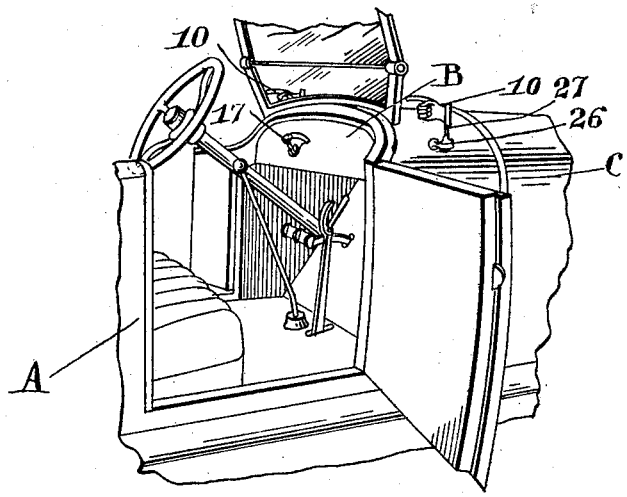
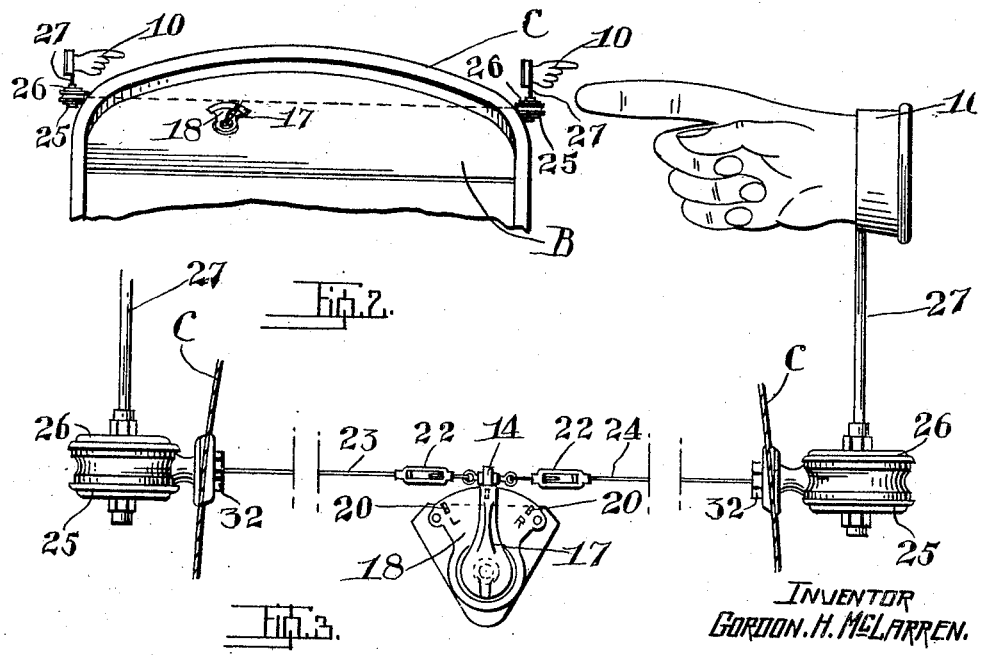

Jan. 20, 1925.  
G. H. McLARREN  
AUTOMOBILE SIGNAL  
Filed Dec. 12, 1923

INVENTOR  
GORDON. H. McLARREN.  
BY  
Fetherstonhaugh & Co.  
ATTYS.

Patented Jan. 20, 1925.

1,523,886

UNITED STATES PATENT OFFICE.

GORDON HILL McLARREN, OF HALIFAX, NOVA SCOTIA, CANADA.

AUTOMOBILE SIGNAL.

Application filed December 12, 1923. Serial No. 680,254.

*To all whom it may concern:*

Be it known that I, GORDON HILL Mc-LARREN, a subject of the King of Great Britain, and resident of the city of Halifax, in the Province of Nova Scotia and Dominion of Canada, have invented certain new and useful Improvements in Automobile Signals, of which the following is a specification.

This invention relates to improvements in automobile signals and the objects of the invention are to provide a simple, effective and practical device of this kind for clearly indicating the direction in which the vehicle is intended to go.

Further objects are the provision of an indicating device of this character in which the various parts will more satisfactorily perform the several functions required of them.

With the foregoing and other objects in view, the invention consists essentially in the novel construction and arrangement of parts described in the present specification and illustrated in the accompanying drawings forming part of the same.

Referring to the drawings, in which like characters of reference indicate corresponding parts in each figure, Figure 1 is a perspective view of an embodiment of my device fitted on an automobile.

Figure 2 is a perspective view of the front of the machine, showing the indicators mounted at each side thereof.

Figure 3 is a perspective detail of the means for operating the indicator mechanism from the car.

Figure 4:
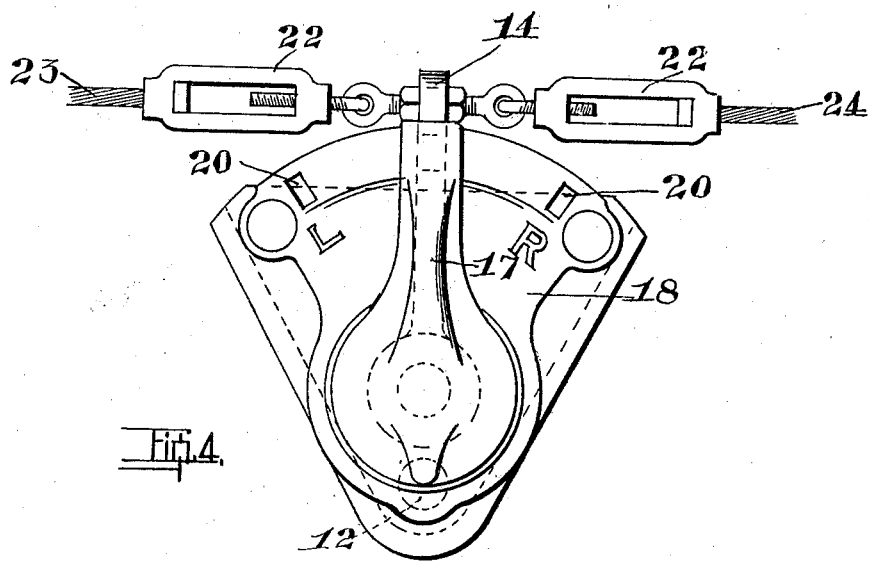
Figure 4 is a front elevation of the operating handle and quadrant.
Figure 5:
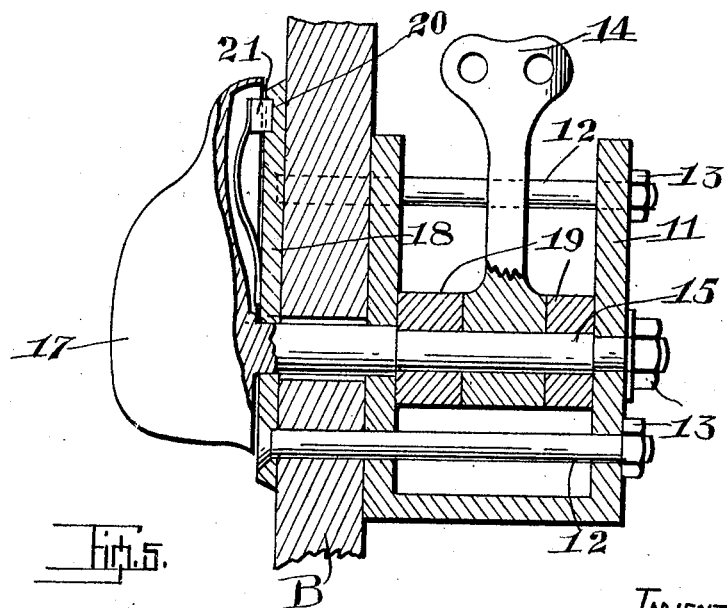
Figure 5 is a side elevation, partly in section.

In the drawings, A indicates an automobile, B the instrument board and C the cowl having at each side the indicators 10 in the form of hands, as hereinafter more fully described.

Mounted in a suitable casting 11 behind the instrument board and secured thereto by means of bolts 12 and nuts 13 is a lever member 14 on a shaft 15 provided at one end with an operating handle 17 adapted to work in combination with the quadrant member 18 on the instrument board. 19 are washers for adjusting the lever 14.

The quadrant member is provided with openings 20 adapted to receive therethrough a spring actuated stop 21 to hold the operating handle 17 in position when moved to right or left.

22 are turn buckles secured on each side of the lever 14 and connected at their other ends to right and left extending cables 23 and 24.

25 and 26 are the body or casing for the indicator members 10 comprising a shaft 27 on which the indicator hand is mounted extending through the body portion 26 and having mounted thereon a pulley 28 grooved to receive the other ends of the cables 23 and 24. The pulley 28 is provided with a stop 29 adapted to act in combination with the stop 30 in the body 26 and also acts as a fastener for the cables 23 and 24.

31 is a tension spring fastened to the pulley 28 and adapted in operation, through the shaft 27, to turn the indicator hand to the left or the right, while 32 is a lock nut for fastening the indicator to the body of the car.

From the foregoing, it will be seen that the cables connected by their inner ends to the turn buckles, enter the indicator body 26 in tangential form through the centre of an attaching bracket 33 counter-sunk to avoid wear on cable. It will also be noted that the cables run from each indicator to the lever 14 at the back of the dash which in turn is connected through the shaft 15 with the operating handle 17.

In operation, the cables having been drawn up till both indicating hands point straight ahead, it is only necessary to turn the operating handle on the dash towards the letter indicating the direction in which it is desired to go. For instance, if it is desired to go to the left, the operating handle is moved to the left and the cable on the right operates the pulley to turn the indicating hand to the left while the tension spring on the pulley to the left turns the left hand indicator accordingly, so that both hands are simultaneously turned in the direction in which it is required to go, and the operation is vice versa for going to the right.

As many changes could be made in the above construction and many apparently widely different embodiments of my invention within the scope of the claims, constructed without departing from the spirit or scope thereof, it is intended that all matter contained in the accompanying specification and drawings shall be interpreted as illustrative and not in a limiting sense.

What I claim as my invention is:

1. In a device of the character described and in combination with the instrument board, a bracket casting rigidly secured to said board, a shaft rotatably mounted in said casting and extending through said board, a lever on said shaft, and means in said lever adapted to engage with tensioned transmitting means connecting the lever with the automobile signal, means for operating the shaft from the driver's seat, and means for retaining the shaft in position when operated.

2. In a device of the character described, the combination with a signal, of means for operating the signal comprising a bracket rigidly supported on the dash, a spindle rotatably mounted in said bracket and adapted to extend through the dash, means for operating the spindle, a lever arm on the spindle, and tensioned transmitting means connecting the lever arm with said signal, and a quadrant member on the dash adapted to engage with said spindle to engage with the operating handle to retain it in position.

In witness whereof I have hereunto set my hand in the presence of two witnesses.

GORDON HILL McLARREN.

Witnesses:
 H. R. McLarny,
 E. W. W. Smil.